United States Patent [19]

Simpson

[11] 4,362,382

[45] Dec. 7, 1982

[54] PRECESSION SCANNING SYSTEM

[75] Inventor: George R. Simpson, Rochester, N.Y.

[73] Assignee: Xerox Corporation, Stamford, Conn.

[21] Appl. No.: 237,058

[22] Filed: Feb. 23, 1981

[51] Int. Cl.³ .............................................. G03B 27/70
[52] U.S. Cl. .......................................... 355/66; 355/8; 355/11; 355/16; 355/51; 355/60
[58] Field of Search ................. 355/8, 11, 16, 51, 57, 355/66, 60, 65

[56] References Cited

U.S. PATENT DOCUMENTS

| | | | |
|---|---|---|---|
| 3,454,335 | 7/1969 | Caldwell et al. | 355/8 |
| 3,650,621 | 3/1972 | Lewis et al. | 355/8 |
| 3,754,822 | 8/1973 | Melrose | 355/8 |
| 3,947,188 | 3/1976 | Simpson | 353/76 |
| 4,212,532 | 7/1980 | Suzuki | 355/8 |
| 4,232,960 | 11/1980 | Glab | 355/8 |
| 4,285,590 | 8/1981 | Silverberg | 355/16 |

Primary Examiner—Monroe H. Hayes

[57] ABSTRACT

The present invention is directed to an object scanning system wherein a dual-rate mirror assembly scans a document on a platen and the scanned image is projected onto a photoreceptor via a corner mirror assembly. The corner mirror assembly is linearly translated during a scan cycle so as to cause the image to be projected onto the photoreceptor in a direction opposite to the photoreceptor movement. The precession rate can be set relative to scanning flyback time so as to reduce or eliminate the interdocument gap on the photoreceptor and to relax rescan time requirements.

6 Claims, 2 Drawing Figures

PRECESSION SCANNING SYSTEM

BACKGROUND AND PRIOR ART STATEMENT

This invention relates generally to a xerographic copying device and, more particularly to an optical system which scans a document lying in an object plane and projects (precesses) the scanned image onto a moving flat photoreceptor at a rate faster than the rate of movement of the photoreceptor and in the direction opposite such photoreceptor movement.

Precession scan systems which expose images on a photoreceptor at a faster rate than the photoreceptor movement are known in the art. U.S. Pat. No. 3,454,335 (Caldwell) assigned to the same assignee as the present invention, discloses a method of projecting images on microfilm cards which are moved past a stationary lens and mirror system onto a drum photoreceptor. The drum and microfilm are moved at the same speed but the image is precessed, i.e. moved in a direction opposite to the drum motion, onto the drum surface by means of a slit aperture which moves in a direction opposite that of the drum. This combined slit and drum rotation exposes the drum at a speed (rate) that is greater than the surface speed of the drum. This scanning system demonstrates two of the advantages gained by image precession: the process speed of the system can be set at a lower speed for equivalent copy rate (copies per minute) and the gap ordinarily present between images (due to the return time of the scan optics) can be reduced or eliminated if desired. Scan return velocities for a given copy rate can also be minimized for a given copy rate thus reducing scan accelerations, forces and vibrations. A problem with such a system, however, is that defocusing errors may result in developed images unacceptable for some systems. The errors are introduced because the image reflected from the drum mirror to the slit does not maintain perpendicularity to a tangential line at the drum surface.

This defocusing problem is addressed in U.S. Pat. No. 4,232,960 (Glab) assigned to the same assignee as the present invention. Glab solves the problem of field tilt in his particular scan system, by using linear and rotational motions of optical elements located near the drum surface to scan the image onto the drum at the angle corresponding to the angle of reflection of the image from the platen.

Another prior art device which utilizes precession onto a flat photoreceptor is disclosed in U.S. Pat. No. 3,650,621 (Lewis) also assigned to the same assignee as the present invention. Lewis discloses a system wherein an imaging device is moved in an arcuate path which is in a direction opposite to drum rotation to scan a document on a curved platen onto the drum.

Precession onto a flat photoreceptor surface introduces different problems requiring a different set of solutions. U.S. Pat. No. 3,754,822 (Melrose) also assigned to the same assignee as the present invention, discloses a scan system wherein a platen and flat photoreceptor move synchronously in the same direction and the scan optics move in the opposite direction at a suitable speed. The disclosure and claims are limited to the specific system disclosed and do not address problems in systems which, for example, have a stationary object or which have a lens movement separate from that of a scan lamp movement. In higher volume copiers, a preferred method of scanning has been to utilize a full-rate, half-rate mirror system which maintains proper object-to-lens distance during the course of travel. Such a scan system is relatively heavy, however, and the above-mentioned flyback inertial problems constitute an important limitation on the speed of the system.

The present invention is directed towards a scanning system which precesses an image from a stationary object onto a flat photoreceptor thereby reducing or eliminating "dead" space on the photoreceptor normally formed during the return of scan interval. The system has variable magnification capabilities and can be used in a copier system employing a full-rate, half-rate scan system.

In one embodiment, a scanning system includes a projection means positioned along an optical path to transmit images from a stationary object plane to a moving image plane, scanning illumination means for scanning an object on said object plane and a corner mirror assembly positioned between said projection means and said imaging plane, said assembly adapted to direct said projected image in substantially perpendicular orientation onto said photoreceptor and in a direction opposite the motion of the imaging plane.

The use of corner mirrors to direct a projected image onto a photoreceptor is known in the art. U.S. Pat. No. 3,947,188 (Simpson) discloses a variable magnification system employing such an arrangement. The combination of a fixed corner mirror precessing the optical axis in conjunction with a fixed lens is not, however, disclosed.

For a better understanding of the present invention, reference may be had to the accompanying drawings in which.

DESCRIPTION

Figure 1:
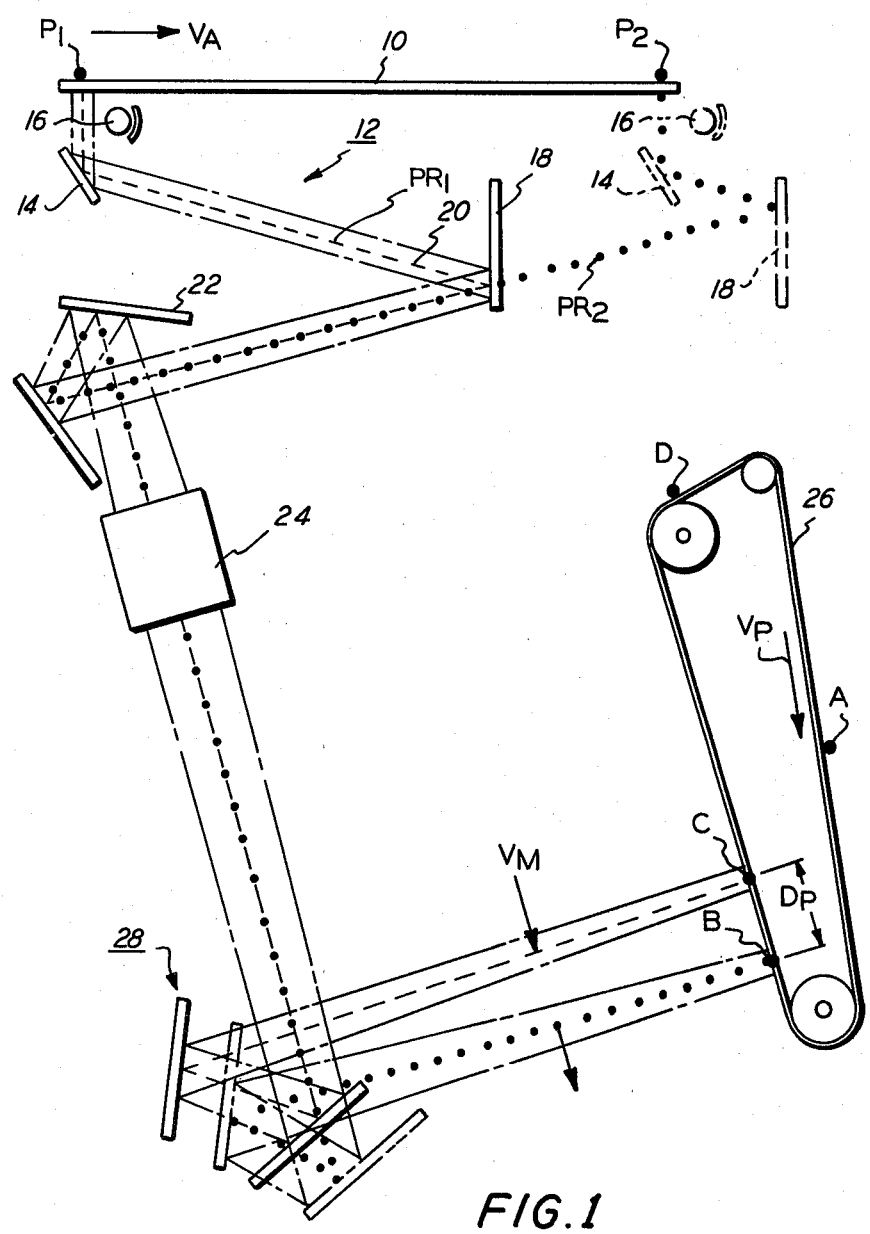
FIG. 1 shows a full-rate, half-rate scan system for a copying device which utilizes a movable roof mirror assembly to precess images onto a moving photoreceptor.

Referring now to FIG. 1, there is shown a 1:1 precession imaging system according to the present invention. A document 10 having a scan length defined by points $P_1P_2$ is in an object plane and upported on a platen (not shown). The document is scanned by a full-rate, half-rate scan system generally designated as 12. System 12 comprises mirror 14 and lamp assembly 16 moving at a velocity $V_A$ and a second mirror 18 moving at a second velocity $V_A/2$. A reflected image of the document, represented by a ray bundle including principal ray $PR_1$ travelling along the optical axis 20, is reflected by a first fixed corner mirror 22 and impinges on fixed lens 24. Lens 24 images onto moving photoreceptor belt 26 via a second corner mirror assembly 28, movable in a manner to be disclosed in further detail below. Belt 26 is moving at a slower speed than the mirror 14, lamp 16 assembly, i.e. $V_P = V_A - V_M$ where $V_M$ is the velocity of the precessing principal ray at the photoreceptor and perpendicular to the photoreceptor.

In operation, and at the start of scan, components 14, 16, 18 and 28 are in their solid line positions. A portion AC of belt 26 is equal in length to $P_1P_2$ with point C defining the image point of object point $P_1$. Scan assembly 14, 16 moves from left to right at velocity $V_A$. Mirror 18, moving at $V_A/2$ reflects light from mirror 14 onto corner mirror assembly 22 which in turn reflects the light into lens 24. This dual-rate, corner mirror system maintains a constant object conjugate during scan.

Lens 24 projects the image forming light onto corner mirror assembly 28 which is linearly translated so as to move the optical axis from point C to point B during scan. This movement of the optical axis, and hence the image points from the document in a direction opposite the direction of movement of belt 26 constitutes precession of the imaging points on the belt with the precession distance defined as the distance $D_P$.

The movement of the corner mirror assembly 28, described in greater detail with reference to FIG. 2, serves to obtain precession of the imaged points onto the belt while maintaining substantially perpendicular orientation of the optical axis with the belt and while maintaining a constant image conjugate. While not shown, the image may be more sharply defined by placing an exposure slit adjacent the photoreceptor surface, the slit being adapted to move with the precessing image.

At the end of scan position, assembly 14, 16 and mirror assembly 28 are in the dotted line position and the principal ray $PR_2$ is now defined by the large dotted path. Belt 26 has moved to position BD with document point $P_2$ being imaged at point B. This condition now enables one of the main advantages of a precession type system. The time taken by belt 26 to move point B back to start of scan position point C can now be used to beneficially alter the rescan conditions. As examples, rescan return velocities can be relaxed to reduce system stresses caused by rapid acceleration and attendent vibrations, and interdocument gaps can be reduced or eliminated as desired enhancing system throughput. In systems including automatic document handling, additional time is also gained to change documents.

The above is documented by examining what occurs in the conventional system where precession is not obtained. In this case, rescan time for any given system would be given by the expression $$T_R = (G/V_P) \qquad (1)$$

When G is the intercopy gap representing the distance the photoreceptor advances before the next scan cycle begins. In the system shown in FIG. 1, G is augmented by the additional distance $D_P$ gained through precession imaging so that the rescan time $T_R$ is increased to a value $$T_R = (D_P + G) \qquad (2)$$

From Equation (2), it is evident that the interdocument gap can be completely eliminated by making $G = 0$. A rescan time $T_R = D_P/V_P$ will result, with reference to FIG. 1, if point B advances to point C during the rescan time and thus serves as initial imaging point for $P_1$ during the next scan cycle.

Figure 2:
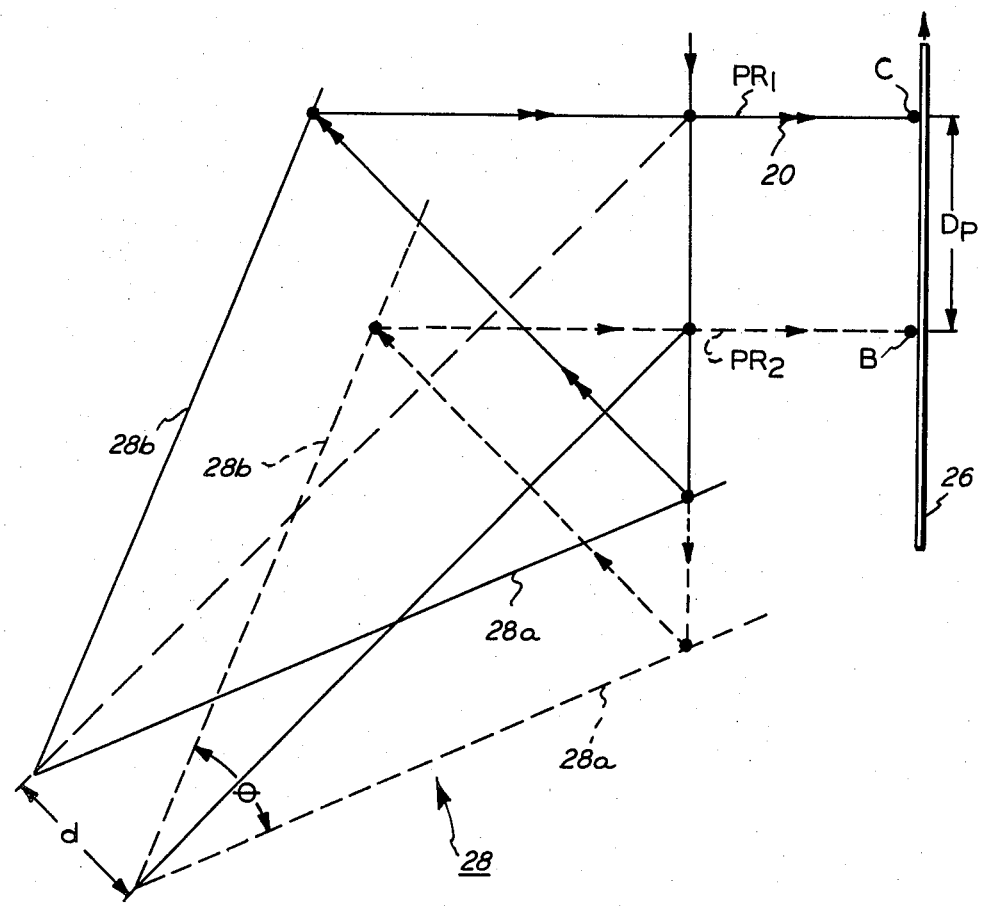
FIG. 2 is an enlarged view of the roof mirror assembly of FIG. 1 illustrating the roof mirror movement which effects the image precession onto the photoreceptor.

Referring now to FIG. 2, corner mirror assembly 28 is constructed so that sides 28a and 28b have an included angle $\theta$ of 45°. The assembly is located so that, as shown in the start of scan (solid line position) principal ray $PR_1$ representing document point $P_1$, is first reflected from mirror 28a and then 28b to achieve a 90° diversion of its initial path. The imaged point $P_1$ thus is directed in substantially perpendicular orientation onto point C on belt 26.

As the scan cycle progresses, assembly 28 is linearly translated at a constant velocity normal to the bisector of angle $\theta$ by a distance $d = BC/\sqrt{2}$. Under these conditions, the optical axis 20 precesses in a direction opposite the movement of belt 26 and the image conjugate is held constant.

At the end of scan, mirror 28 has been translated to the dotted position shown so that document point $P_2$ is now imaged at point B with $D_P$ defining the precession distance.

To summarize the above, in a system where the scan and photoreceptor rates are equal, precession is obtained by introducing a roof mirror between the projection lens and the photoreceptor. The mirror elements are so arranged as to reflect projected light substantially perpendicularly onto the photoreceptor. The roof mirror is linearly translated so as to move the imaging points in a direction opposite the movement (i.e. precess the image) while simultaneously maintaining constant image conjugate.

While a specific embodiment has been described, other changes and modifications are possible consistant with the principles of the present invention. For example, the movement of the corner mirror may be in directions other than normal to its bisector, the normal direction being selected becasue of its mathematical simplicity. Similarly, the precession direction can be at angles other then the 90° reorientation, and while a dual-rate mirror assembly is used to scan the document, a single scan mirror assembly may be suitable for some systems. Also, although a corner mirror is the preferred device for precessing the optical axis, other elements having similar redirection properties such a penta prism may be employed.

In a further comment, the system shown in FIG. 1 is for a 1:1 magnification system. The present invention may also be utilized in multimagnification modes. This would require movement of lens 24 and assembly 28 along the optical axis or parallel to the bisector of $\theta$ in assembly 28 to maintain a constant total conjugate as is known in the art. An alternate method of appropriately adjusting the object conjugate and image conjugate to effect the desired magnification is to leave the lens 24 fixed in position and move assemblies 22 and 28 along their respective bisectors.

What is claimed is:

1. An optical system for a copying device wherein a stationary document lying on an object plane is imaged onto a flat photoreceptor, said system comprising:
    an illumination scanning means for scanning said document at a scanning speed $V_A$,
    projection means positioned between said scanning means and said photoreceptor moving at a velocity $V_P$, said projecting means adapted to project reflected images of the document along an optical path towards said photoreceptor, and
    a corner mirror assembly positioned along the optical path between said projecting means and said photoreceptor, said assembly adapted to move along a linear path during said scanning operation so as to reflect said projected images, in substantially perpendicular orientation, onto said photoreceptor, said linear movement causing said reflected images to precess along the surface of the photoreceptor at a speed $V_M$ equal to $V_A - V_P$ and along a precession distance $D_P$.

2. The optical system of claim 1 wherein said mirror assembly comprises a pair of mirrors having an included angle $\theta = 45°$ and wherein said linear path is in a direction normal to the bisector of the 45° included angle and along a distance $d = D_P/\sqrt{2}$.

3. The optical system of claim 1 wherein said scanning means includes a full-rate/half-rate mirror assembly, said system further including a second corner mirror assembly positioned along the optical path between said scanning means and said projection means.

4. The optical system of claim 3 wherein both corner mirror assemblies are movable along their respective bisectors to accommodate changes in magnification.

5. The optical system of claim 1 wherein said projection means and said mirror assembly are movable along said optical axis to accommodate changes in magnification.

6. The optical system of claim 1 further including an exposure slit adjacent said photoreceptor, said slit adapted to move with said projected image and exclude extraneous light.

* * * * *

UNITED STATES PATENT AND TRADEMARK OFFICE
CERTIFICATE OF CORRECTION

PATENT NO. : 4,362,382

DATED : December 7, 1982

INVENTOR(S) : GEORGE R. SIMPSON

It is certified that error appears in the above-identified patent and that said Letters Patent are hereby corrected as shown below:

Col. 2, line 47 "upported" should read --supported--.

Col. 3, line 43, Example 1 should read -- $\frac{G}{V_P}$ --.

Col. 3, line 52, Example 2 should read -- $T_R = \frac{D_P + G}{V_P}$ --.

Signed and Sealed this

Twentieth Day of December 1983

[SEAL]

*Attest:*

*Attesting Officer*

GERALD J. MOSSINGHOFF

*Commissioner of Patents and Trademarks*